Figure 3:
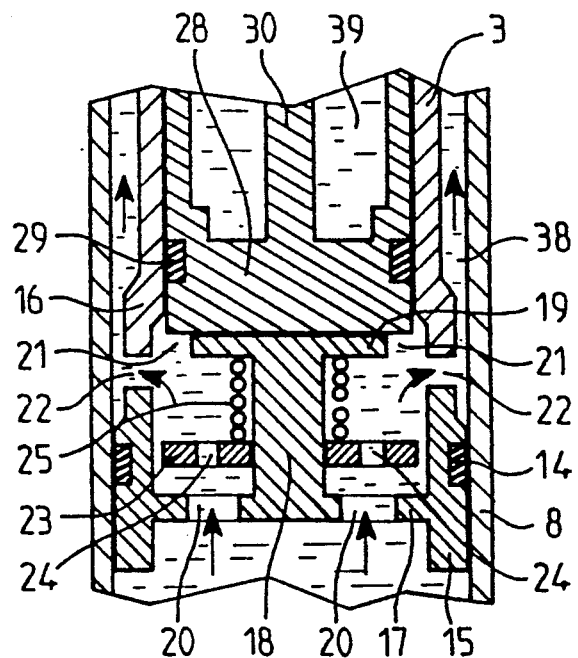

United States Patent [19]

Jampy et al.

[11] Patent Number: 5,094,407

[45] Date of Patent: Mar. 10, 1992

[54] DEVICE FOR REDUCING THE FLEXIBILITY OF AN OLEO-PNEUMATIC SHOCK ABSORBER FOR AN UNDERCARRIAGE, AND SHOCK ABSORBER AND UNDERCARRIAGE INCLUDING IT

[75] Inventors: Bernard Jampy, Fuveau; Claude Bietenhader, Lambesc; Bernard Plissonneau, Aix-en-Provence, all of France

[73] Assignee: Aerospatiale Societe Nationale Industrielle S.A., Paris, France

[21] Appl. No.: 524,113

[22] Filed: May 16, 1990

[30] Foreign Application Priority Data

May 18, 1989 [FR] France .................. 89 06510

[51] Int. Cl.$^5$ ............................. B64C 25/60
[52] U.S. Cl. ......................... 244/104 FP; 267/64.26
[58] Field of Search ................ 244/104 R, 104 FP; 267/64.15, 64.16, 64.25, 64.26, 64.28, 127; 188/299, 266, 279, 282, 311, 314, 322.15, 322.21, 319, 315, 269

[56] References Cited

U.S. PATENT DOCUMENTS

| | | | |
|---|---|---|---|
| 2,698,751 | 1/1955 | Nye et al. | 244/104 FP |
| 3,290,037 | 12/1966 | Robinson et al. | 267/64.26 |
| 4,524,929 | 6/1985 | Gebhard | 244/104 FP |
| 4,630,788 | 12/1986 | Veaux et al. | 244/104 FP |
| 4,720,085 | 1/1988 | Shinbari et al. | 267/64.26 |
| 4,886,248 | 12/1989 | Delhaye et al. | 244/104 FP |

FOREIGN PATENT DOCUMENTS

| | | |
|---|---|---|
| 849258 | 11/1939 | France . |
| 1003247 | 11/1951 | France . |
| 1239315 | 7/1960 | France . |
| 2340482 | 9/1977 | France . |
| 2370196 | 6/1978 | France . |
| 2386427 | 11/1978 | France . |
| 2461852 | 2/1981 | France . |
| 2489458 | 3/1982 | France . |
| 2493444 | 5/1982 | France . |
| 2554415 | 5/1985 | France . |
| 461144 | 2/1937 | United Kingdom ......... 244/104 FP |

*Primary Examiner*—Galen Barefoot
*Attorney, Agent, or Firm*—Armstrong, Nikaido, Marmelstein, Kubovcik & Murray

[57] ABSTRACT

The invention relates to a device for reducing the damping flexibility of a suspension shock absorber for an undercarriage, in particular the main undercarriage of a helicopter, and a shock absorber and an undercarriage including it.

The shock absorber is of the oleo-pneumatic type, and at least one of the incompressible and compressible fluids of the shock absorber is at least partially transferred from an expansion chamber (31) of the latter into a transfer chamber (42) of an accumulator (40) external to the shock absorber (1, 8), and in which the transfer chamber (42) is isolated from a return chamber (43) by a separating piston (41). The connection between the transfer chamber (42) and the corresponding expansion chamber (31) can be cut off by an electro-valve (44), in order to isolate the shock absorber (1, 8) from at least part of the low pressure gas chamber (34) of its expansion chamber (31).

Application to the undercarriage equipment, in particular the main undercarriages of ship-borne helicopters.

24 Claims, 4 Drawing Sheets

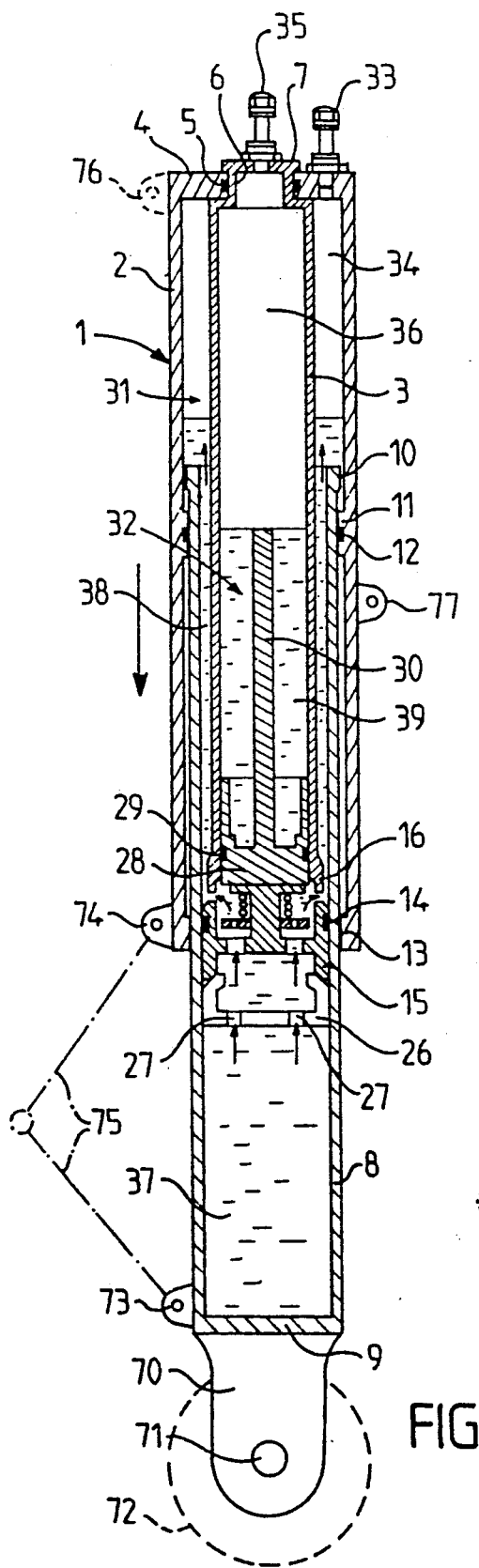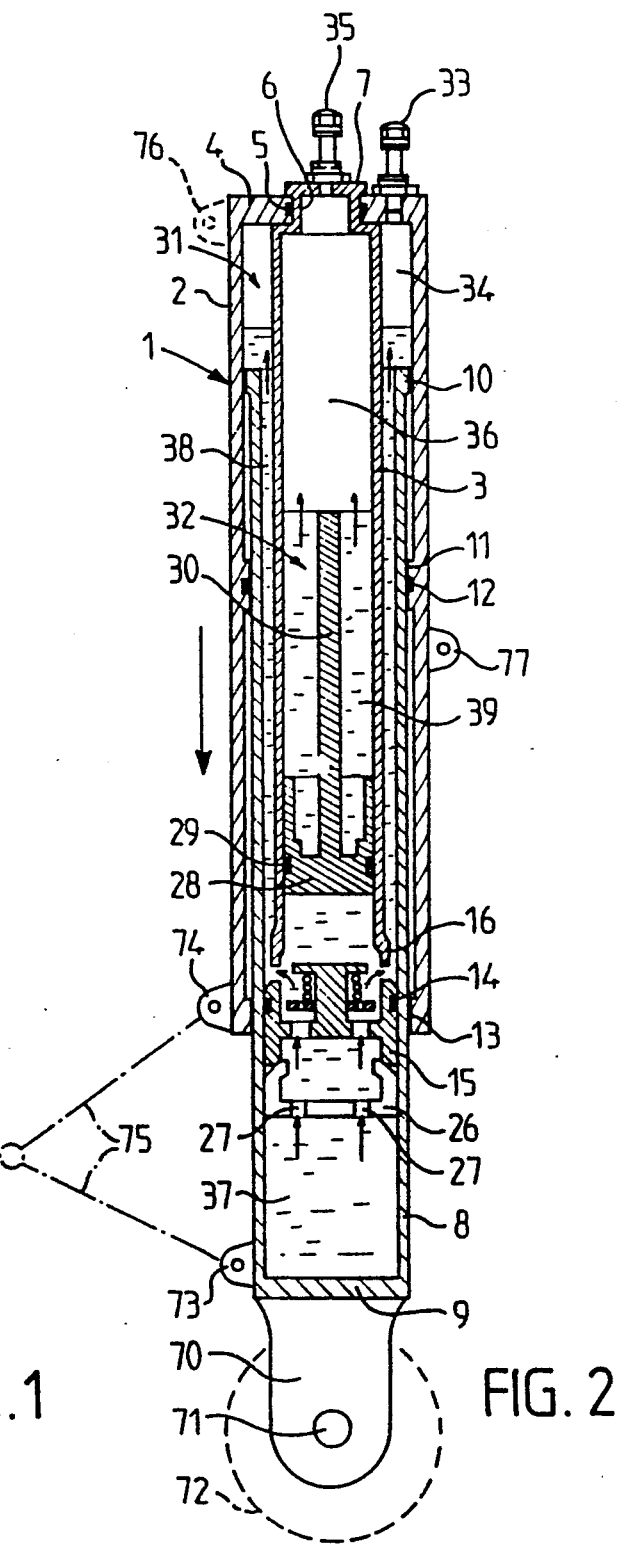

DEVICE FOR REDUCING THE FLEXIBILITY OF AN OLEO-PNEUMATIC SHOCK ABSORBER FOR AN UNDERCARRIAGE, AND SHOCK ABSORBER AND UNDERCARRIAGE INCLUDING IT

The present invention relates to a shock absorber for an aircraft undercarriage, a device whose function is to elastically absorb, with damping, the descent energy of the aircraft during landing. It relates more precisely to a device allowing a reduction, or even an elimination in practice, of the flexibility of such an oleo-pneumatic type suspension shock absorber for a helicopter undercarriage, and in particular a main undercarriage of the landing gear of a ship-borne helicopter, i.e. intended to be used on ships such as aircraft carrying ships (helicopter carriers or aircraft carriers) or ships of lower tonnage (such as corvettes or helicopter carrying frigates), equipped with a landing and takeoff platform adjoining a hangar for parking a helicopter, or on sea work platforms, particularly of the "self-raising" type.

It is known that ship-borne helicopters are often "naval" versions of helicopters initially designed for land applications, and for which it is advantageous to increase the stability, particularly the lateral stability, of ship-borne and touched down helicopters in order to prevent, before their takeoff or after their touch down, the risk of the latter being overturned by the pitch and-/or roll movements of landing platforms built onto the carrying ships, as well as by the violent winds which often sweep these landing platforms and the "helicopter" decks of sea work platforms.

It should also be noted that these increased stability requirements, in particular lateral, for ship-borne helicopters reappear, to a certain degree, for the use of helicopters from land surfaces which are inclined or sloping and often swept by violent winds, such as occurs in mountainous areas for example.

The device according to the invention, intended to reduce the flexibility of a shock absorber, has been specifically designed for being fitted, as original equipment or as an additional or optional device fitted as a "retrofit", to the oleo-pneumatic suspension shock absorbers of undercarriages, in particular main under-carriages, of ship-borne helicopters.

It is known that numerous studies have been undertaken for increasing the stability, in particular the lateral stability, of ship-borne helicopters whose general architecture and undercarriages have not been originally optimized for ship-borne use.

Certain of the these studies have led to the use of additional devices intended to be fitted to such helicopters in order to increase their stability.

Devices of this type are the subject of the French Pat. application No. 88 00443 by the Applicant, which proposes adding, on either side of the fuselage of the helicopter, auxiliary lateral stabilizers fitted with lateral wheels, and intended to increase the support polygon of the helicopter on the landing platform.

Furthermore, in order to reduce or eliminate the instability of a helicopter when it is standing on an unstable platform, it has already been proposed to fit its undercarriages with special suspension shock absorbers.

A suspension shock absorber of this type is described in European Pat. application No. 122 731, and comprises a hollow piston rod and a piston axially mounted in a sliding manner in a cylinder filled with hydraulic fluid, and a passage for fluid under compression produced in the piston, and through which the fluid is throttled during a compression of the shock absorber, and a passage for fluid during expansion, through which the hydraulic fluid flows during an expansion of the shock absorber, the latter furthermore comprising a selectively functioning valve intended to close the passage for fluid during expansion, in order to prevent the expansion of the shock absorber while allowing any new compression of the latter.

The passage for fluid during expansion can be produced in the thickness of the wall of the cylinder, and the valve can be manually operated, for example by rotation, between an open position and a closed position of this passage. But the passage for fluid during expansion can also be produced in a housing inside a section of reduced diameter which extends the hollow rod beyond the piston, this section of reduced diameter passing through the upper base of the cylinder in order to protrude beyond the latter. The valve is then a valve which axially slides between two positions in the housing and is returned by a spring into a position in which it allows the flow of fluid through the passage during expansion. This valve can then be controlled by a cable attached to the valve, passing through the section of reduced diameter of the rod, and connected to an operating lever, manually operated and mounted in a pivoting manner on the protruding end of this section of reduced diameter, above the cylinder. As a variant, the lever for pulling the control cable of the valve can be displaced by a small hydraulic double-acting jack, connected to the hydraulic circuit of the helicopter and controlled from the flight control panel on the latter.

When a helicopter whose undercarriages are fitted with such a suspension shock absorber has touched down on an unstable platform and after the initial compression of the shock absorbers, on impact, followed by a possible expansion up to their compressed under static load (corresponding to the weight of the helicopter) position, the operation of the valves of the shock absorbers effectively blocks any flow of hydraulic fluid on return through the expansion passage, which prevents any expansion or extension of the shock absorber, while allowing any subsequent compression which can be caused by the movements of the unstable platform. Thus, the cyclic movements of compression and expansion of the shock absorbers, causing their cyclic shortenings and extensions, are prevented while the helicopter is touched down on the unstable platform, thus reducing any instability of the helicopter which would result from it.

As the transfers of hydraulic fluid between two internal chambers of the shock absorber remain possible in compression, but are prevented in expansion, it is understood that the stability is improved, not only by the elimination of cyclic compression-extension movements of the shock absorbers, but also by the fact that these shock absorbers can only retract, which lowers the center of gravity of the helicopter and has a favourable effect on its stability. However, in the case of opposing stresses on the two main undercarriages, for example because of a strong lateral wind and/or a large lateral inclination of the platform, which results in relieving an undercarriage with respect to the static load, without this undercarriage being able to extend, and in overloading the other undercarriage with respect to the static load, causing its shortening without it then being able to extend in order to regain its initial length once the differential stress is over, it is noted that the helicopter remains laterally inclined by being depressed on one side with respect to the other, which is not at all favourable with respect to subsequent movements of inclination of the platform.

With the same object of improving the stability of a helicopter touched down on an unstable or inclined surface, such as a ship-borne helicopter on a ship, and to facilitate certain maneuvers and/or improve certain characteristics of the helicopter, for example its loading and its transport in a cargo aircraft, its anchoring on a parking area, for example in a hangar, and for placing the touched down helicopter in an extralowered configuration, reducing the dangerous effects of ground resonance, there have already been proposed by the French Pat. No. 2 340 482 and its Patent of addition 2 370 196, shock absorber-jacks for undercarriages, in particular helicopter balance arm undercarriages, simultaneously providing the shock absorbing function on landing or on takeoff as well as on rolling, the support under static load of the stationary and touched down helicopter, and a jack function, providing the raising or lowering of the undercarriages in flight, and the extra lowering of the helicopter standing on its wheels, starting from its position under static load, and the return to this latter position, starting from the extra-lowered position, by means of a special hydraulic control applied to such a shock absorber-jack of special structure.

According to the French Pat. No. 2 340 482, this special structure comprises a shock absorber, which can be a suspension shock absorber of conventional structure, for a helicopter undercarriage, comprising in particular a shock absorber rod mounted in sliding and sealed manner in a first hydraulic fluid chamber of a cylinder, the rod or the cylinder enclosing a low pressure elastic return chamber, such as a pressurized gas chamber, and a volume of hydraulic fluid possibly adjacent to the low pressure chamber and in communication with the first chamber of the cylinder by at least one compression throttling orifice, presented, for example, by a piston carried by the end of the shock absorber rod received inside the cylinder, the expansion of the low pressure chamber being braked by an expansion throttling valve, this shock absorber being mounted at the end of a jack rod, whose first chamber serves as a cylinder for the shock absorber, and is itself integral with a jack piston mounted in a sliding manner in a jack cylinder, with which this piston defines a chamber controlling the lowering of the undercarriage when it is supplied with hydraulic fluid, and controlling its putting into the extra-lowered position when it is emptied, without modification of the load of the shock absorber. Furthermore, a raising piston, mounted in a sliding manner in a second chamber of the jack rod, separate from the first one, and constituting a raising chamber of the undercarriage, allows the loading of the shock absorber by drawing the rod of the latter towards the interior of the rod of the jack, when this second chamber is supplied with hydraulic fluid and the lowering chamber is empty, which brings the undercarriage into the retracted position. A mechanical locking device, for example one with claws, or a hydraulic one comprising a hydraulic locking valve with controlled opening, is furthermore provided for locking the jack rod in the out position with respect to the jack cylinder, after filling the lowering chamber.

According to the Patent of addition 2 370 196 to the abovementioned French patent, there is furthermore provided in the shock absorber-jack which is its subject an additional chamber, adjacent to the lowering chamber, from which it is separated by at least one separating piston which is returned by elastic means against a stop, and which is displaced against these elastic means, under the effect of the expansions of the hydraulic fluid of the lowering chamber, in such a way that this additional chamber constitutes a chamber for accumulation of the expansions of this hydraulic fluid. In order that this additional chamber may also have the function of a chamber for accumulation of the expansions of the hydraulic fluid of the raising chamber, the section of the second chamber which is not occupied by the raising chamber is also put into communication with the lowering chamber. The elastic means can consist of a spring disposed in the chamber for accumulation of the expansions, which is filled with hydraulic fluid and in communication with an expansion valve allowing, according to requirements, a partial draining of the accumulation chamber when the separating piston is displaced against the spring by the expansion of the hydraulic fluid, as well as a refilling of the accumulation chamber during the application of a lowering pressure in the lowering chamber, but it is preferable that the chamber for accumulation of the expansions should enclose a pressurized gas, constituting a pneumatic spring, and simultaneously an additional damping chamber, whose effects are added to those of the oleo-pneumatic shock absorber fitted to the shock absorber-jack. In this case, it is advantageous that the stop against which the elastic means apply the separating piston should be constituted in the form of an internal wall of the cylinder, provided with at least one axial orifice opening onto at least one throttling valve situated between the wall and the separating piston, in order to constitute a second shock absorber.

In all cases, the variations in length of the shock absorber-jack in order to make it change from one to the other of its two characteristic positions which are the raised position and the extended position, as well as from one to the other of two other characteristic positions which are the position under static load and the extra-lowered position, are obtained solely by the transfer of the hydraulic fluid from the jack circuit, independent of the shock absorber fluids, to the lowering and raising chambers, or to the exterior from these chambers.

In order to improve the energy absorbing capability at high impact speeds, without losing the inherent advantages of shock absorbers and shock absorber-jacks capable of adopting an extra-lowered position, from the position under static load, it has been proposed in the French Pat. No. 2 461 852 that the hydraulic fluid pressure existing in a first chamber of a shock absorber cylinder in which a shock absorber rod slides, is applied to a mobile base, which itself bears on a force threshold element, allowing a travel of the mobile base during a compression loading of the shock absorber, starting from a force greater than a given threshold, and in a way which is independent of the speed of penetration of the shock absorber rod in the cylinder, this force threshold element preferably being constituted by a high pressure elastic return chamber, whose expansion is braked by an expansion throttling valve. In the case of a shock absorber-jack, the cylinder furthermore comprises a second hydraulic fluid chamber, in which a jack rod is mounted in a sliding and sealed manner, defines respectively by its internal surface and its external surface, a lowering chamber and a raising chamber, capable of being supplied with hydraulic fluid in order to provide respectively the extension and the withdrawal of the jack rod from or into the second chamber of the cylinder. Furthermore, in the case of a shock absorber-jack for an undercarriage which can be raised, a traction piston can be mounted in a sliding and sealed manner, on the one hand inside the first chamber of the cylinder and, on the other hand, around the end of the shock absorber rod inside the first chamber of the cylinder, in order to define with this cylinder a retraction chamber intended to be supplied with hydraulic fluid in order to apply the retraction piston against a stop which is integral with the shock absorber rod, and to control the retraction of the latter in the first chamber of the cylinder, in order to obtain the minimum length of the shock absorber-jack when the jack rod is simultaneously withdrawn.

In such a shock absorber-jack, the first chamber, the force threshold element and the second chamber can be disposed one after the other in the cylinder, the first chamber being delimited between the end of the shock absorber rod received in the cylinder and the mobile base, and the second chamber being separated from the force threshold element by a transverse partition of the cylinder. But it is also possible for the first chamber to be delimited between the shock absorber rod and a fixed base of the cylinder provided with a communication passage to an additional chamber in which the force threshold element is housed. This additional chamber can be an annular chamber of the cylinder, surrounding the first chamber, and in which the mobile base is constituted in the form of an annular piston mounted in a sliding manner, or the additional chamber is contained in a bottle external to the cylinder, in which the mobile base is a separating piston mounted in a sliding manner, separating fluid in permanent communication with the first chamber of the cylinder, and a pneumatic spring constituting a high pressure gas chamber, whose effects combine with those of the low pressure gas chamber housed in the shock absorber rod, such that the shock absorber is of the two-chamber type.

Furthermore, in these different variants, the variations in length of the shock absorbers or shock absorber-jacks, in order to change from one to the other of two characteristic positions which are the position under static load and the extra-lowered position and, possibly, in order to change from one to the other of two characteristic positions which are the undercarriage extended position and the undercarriage raised position, are obtained by means of the draining or filling of the raising or lowering chambers and possibly of the retraction chamber, with hydraulic fluid of a jack circuit, independent of the shock absorber fluids, and without modification of the flexibility defined b the volume or volumes of pressurized gas in the shock absorber.

The same conclusions can be drawn with respect to the shock absorber-jack with a mobile base described in the French Pat. No. 2 493 444, which is distinguished from the subject of the French Pat. No. 2 461 852 only by the presence of an additional separating piston mounted in a sliding and sealed manner inside the shock absorber rod in order to separate, in the latter, a lower pressurized gas chamber from an upper hydraulic fluid chamber.

Still with the same object of improving the stability of ship-borne helicopters, by lowering their center of gravity, as well as in order to reduce their overall dimensions in the hold of a cargo aircraft or in a ship's hangar, the French Pat. No. 2 554 415 has proposed an orientable undercarriage fitted with a suspension shock absorber, a device for collapsing the undercarriage, and a steering or orienting device, controlled by the pilot in order to facilitate parking maneuvers. The collapsing device comprises two jacks, one of which is an external or annular jack, having a chamber delimited inside a cylindrical undercarriage box and around the outer tube of a rod having two coaxial tubes of different cross-sections, connected by a base at one of their ends, and between which slides a cylinder defining the shock absorber with the rod, and the other of which is an internal jack with a chamber delimited in the internal tube of the rod, above a separating piston separating it from a gas chamber of the shock absorber. The supply and draining of the annular jack chamber with hydraulic fluid coming from a jack circuit independent from the fluids of the shock absorber respectively provide the lowering and raising of the shock absorber as a whole with respect to the undercarriage box, such that the variation in length between the upper end of the box and the wheel or wheels carried by the lower end of the shock absorber cylinder has no effect on the elasticity of the shock absorber. The draining of the internal jack chamber allows the volume of the gas chamber of the shock absorber to be increased but, as the latter is under static load, this increase in volume is compensated for by the raising of the level of the hydraulic fluid inside the internal tube of the shock absorber rod, until there is a return to the same static pressure level over the same volume of gas, even though the undercarriage is shortened by the withdrawal of the cylinder between the two tubes of the rod, but without modification of its elasticity.

Finally, the French Pat. No. 849 258 has proposed a landing gear for aircraft which can be raised and retracted during the raising. Each undercarriage supports an oleo-pneumatic shock absorber with a rod containing a pressurized gas chamber and whose lower end comprises a wheel, while its upper end carries a piston by which it is mounted in a sliding and sealed manner inside a cylinder filled with hydraulic fluid in its chamber above the piston and in the annular chamber around the rod and under the piston, the latter being pierced with throttling orifices some of which work in conjunction with a diaphragm, in order to throttle the transfer of hydraulic fluid from the cylinder to the inside of the rod, by compressing the gas chamber contained in the latter, and whose hydraulic fluid is separated by a separating piston. The lower end of the lower annular chamber of the cylinder is in communication with the inlet of an auxiliary recipient arranged as a gas chamber, by means of a flexible pipe and a valve which brakes the draining of this annular chamber, and therefore the extension of the rod, but facilitates the filling of this annular chamber from a reserve of hydraulic fluid in the gas chamber, during the withdrawals of the rod into the cylinder. The upper end of the upper chamber of the latter is also connected to the inlet of the auxiliary recipient by means of flexible pipes and a valve box which normally closes the communication between the cylinder and the auxiliary recipient and which is controlled by the hydraulic pressure operating a raising jack of the undercarriage, in order that this communication may be open during the withdrawal of the rod into the cylinder, during raising, this withdrawal being caused by traction on the rod by means of a cable. In this way the volume of hydraulic fluid expelled from the cylinder by the withdrawal of the rod and which is not necessary for compensating the increase in volume of the lower annular chamber is transferred from the upper chamber of the cylinder to the auxiliary recipient, without having to excessively load the shock absorber. In normal configuration, when the valve box is closed, the elasticity of the suspension is always determined by the pressurized gas chamber in the shock absorber rod. Assuming that, in an abnormal configuration, the shock absorber is made to operate while the valve box is open, it can be seen that the elasticity of the suspension would then be defined not only by the pressurized gas chamber contained inside the shock absorber rod, but also by the gas chamber contained in the auxiliary recipient in such a way that the suspension can only be more flexible, which is not appropriate for increasing the stability of an aircraft which would be fitted with such undercarriages.

The object of the invention is to overcome the disadvantages and/or inadequacies of shock absorbers for ship-borne helicopter undercarriages of the prior art, arranged to improve their stability, by stiffening the shock absorbers or by hardening them after a compression travel following a landing.

It is therefore an object of the invention to propose a device intended to be fitted to the oleopneumatic suspension shock absorbers of undercarriages, particularly main undercarriages, of ship-borne helicopters in order to reduce, and even eliminate in practice, after the landing or flight-deck landing, the flexibility of such shock absorbers, and to thus significantly increase the dynamic roll stability of ship-borne helicopters thus fitted.

When the shock absorbers fitted with the device according to the invention do not furthermore comprise means of providing their retraction in order to reach an extra-lowered position with respect to the position under static load, in order to improve the stability of the helicopter by lowering its center of gravity, another object of the invention is to propose a device allowing the simultaneous provision of such a retraction.

The basic idea of the invention consists in providing the blocking or locking of the shock absorber on one of the shock absorber fluids (incompressible hydraulic fluid and compressible fluid or gas), after having at least partially transferred to the exterior of the shock absorber, at least one of the shock absorber fluids, this fluid transfer being able to give rise, in a configuration according to the invention, to a simultaneous retraction of the shock absorber.

For this purpose, the invention proposes a device for reducing the elasticity of an oleo-pneumatic suspension shock absorber for aircraft undercarriages, in particular for ship-borne helicopters, the shock absorber being of the type comprising a shock absorber body, at least one shock absorber piston, and at least one shock absorber rod mounted in a sliding and sealed manner in the body, these elements defining in the shock absorber at least one compression chamber, containing a substantially incompressible hydraulic fluid, and at least one expansion chamber containing at least one volume of hydraulic fluid adjacent to at least one volume of fluid which is compressible under pressure, and in communication with the said compression chamber by the intermediary of throttling means, which delimit at least one throttling passage under compression of the hydraulic fluid expelled from the compression chamber into the adjacent volume of hydraulic fluid of the expansion chamber, when the shock absorber is caused to compress, and at least one throttling passage under expansion for the hydraulic fluid expelled from the adjacent volume of the expansion chamber into the compression chamber, when the shock absorber is caused to expand, and the device according to the invention is defined in that it comprises at least one sealed accumulator which is external to the shock absorber, at least one separating piston mounted in a sliding and sealed manner in the accumulator, in such a way as to delimit in the latter two chambers of oppositely variable volume, isolated from each other, one of which is a transfer chamber and the other of which is a return chamber, at least one transfer duct, connecting the said transfer chamber of the accumulator to at least one expansion chamber of the shock absorber, and controlled means of selectively blocking this duct, these means being maneuverable between two positions, one of which is a duct open position, allowing the transfer of at least a part of at least one fluid from the expansion chamber of the shock absorber, when the latter is loaded in compression, into the transfer chamber of the accumulator, or the return of this fluid from this transfer chamber into the expansion chamber of the shock absorber, when the latter is caused to expand, and the other of which is a closed position isolating the said expansion chamber of the shock absorber from the said accumulator in which the said volume of compressible fluid is at least partially retained.

When the shock absorber comprises at least two expansion chambers, whose compressible fluid volumes are initially pressurized at different pressures, the most substantial reduction of the elasticity of the shock absorber is obtained if, according to the invention, the transfer chamber of the accumulator is connected to that one of the expansion chambers of the shock absorber whose compressible fluid volume is pressurized at the lowest pressure.

It is thus possible, after or during a landing or flight-deck landing under normal conditions, and as a consequence of the compression of the shock absorber which results from it, and which corresponds to a certain penetration of the shock absorber rod in the cylinder, to transfer by the controlled means of blocking in the open position, at least part of at least one fluid of the expansion chamber of the shock absorber into the accumulator, and then, by the closing of the controlled means of blocking, to isolate the shock absorber from the effects of the compression or expansion of at least a part, but preferably of the totality, of the compressible fluid volume which is retained in the accumulator, and in particular of the compressible fluid volume initially pressurized at the lowest pressure, when the accumulator comprises several expansion chambers. This results in a reduction, or even an elimination, of the flexibility over the volume of compressible fluid, or over that of the volumes at the lowest initial pressure, i.e. in all cases a hardening of the shock absorber, and therefore an increase in the dynamic stability of the helicopter.

In a preferred embodiment of the device according to the invention, suitable for all undercarriage suspension shock absorbers, whether or not they are provided with special internal or external means allowing their retraction into an extra-lowered position, with respect to the position under static load, and on condition that the shock absorber comprises at least one expansion chamber of which a compressible fluid volume, formed by a chamber of gas which is preferably pressurized at the lowest initial pressure, and an adjacent volume of hydraulic fluid are housed in the body and/or the shock absorber rod, the device according to the invention is defined in that the transfer duct connects the transfer chamber of the accumulator to the pressurized gas chamber, such that the pressurized gas is transferred from the expansion chamber to the transfer chamber and fills the latter, when the shock absorber is caused to compress and after opening the controlled means of selective blocking, which are closed in the rest state, for the normal functioning of the shock absorber, and after filling the transfer chamber with pressurized gas, in order to harden the shock absorber, the return chamber of the accumulator being connected to an operating fluid circuit distributor, comprising a duct for the supply of pressurized operating fluid and a duct for the return of the operating fluid to a reservoir, the distributor being a controlled distributor having at least three ways and at least two positions, one of which is a position of draining the return chamber, connecting the latter to the return duct, and allowing the draining of the return chamber of operating fluid in order to allow the filling of the transfer chamber with compressed gas, after the opening of the controlled means of selective blocking, and of which the other is a position of filling the return chamber, connecting the latter to the pressurized operating fluid supply duct, and allowing the filling of the return chamber with pressurized operating fluid in order to provide the draining of the transfer chamber, and the return of the pressurized gas into the expansion chamber of the shock absorber, after opening the controlled means of selective blocking.

This embodiment therefore allows, after a landing or a flight-deck landing carried out under normal conditions, and while the controlled means of selective blocking are closed, the bringing of the shock absorber into the position under static load, by compressing at least one pressurized gas chamber by the transfer of hydraulic fluid from the compression chamber into the adjacent volume of hydraulic fluid in the corresponding expansion chamber. By the control of the opening of the controlled means of selective blocking, and by the control of the distributor put into the position of draining the return chamber, the gas of the pressurized gas chamber escapes from the shock absorber through the transfer duct and fills the transfer chamber of the accumulator. This transfer of gas into the accumulator is compensated, in the expansion chamber of the shock absorber, by a passage of hydraulic fluid from the compression chamber into the adjacent volume of hydraulic fluid of the expansion chamber, which gives rise to an additional penetration of the shock absorber rod in the shock absorber cylinder, and therefore to a reduction in the axial dimension or length of the shock absorber under static load, which enables the undercarriage to be displaced into an extra-lowered position, with respect to the normal position under static load. The closing of the controlled means of selective blocking then allows the isolation of the shock absorber from the effects of compression or expansion of the volume of pressurized gas transferred into the transfer chamber of the accumulator.

This embodiment of the device therefore allows the simultaneous provision of the retraction of the shock absorber and therefore of the undercarriage, over a certain length starting from the normal position under static load, and the elimination of the flexibility in the shock absorber, which allows the stability of a ship-borne helicopter to be increased by acting on two parameters: the retraction of the shock absorbers and of the undercarriages, in particular the main undercarriages, gives rise to the lowering of the center of gravity of the helicopter touched down on the unstable surface, which increases the static stability, in particular the lateral static stability, of the helicopter on the one hand, and, on the other hand, the hardening of the shock absorbers increases the dynamic stability of the entire helicopter especially in roll during movements of the unstable surface, i.e. of the platform on which it is touched down.

The return to normal position under static load is obtained by controlling the opening of the controlled means of selective blocking and by controlling the passage of the distributor into the position of filling the return chamber. The latter is then supplied with pressurized operating fluid, which pushes the separating piston in the accumulator, in a direction which empties the transfer chamber of the volume of compressed gas which it contained and which is transferred into the expansion chamber of the shock absorber. This transfer of gas from the accumulator into the shock absorber causes a corresponding transfer of hydraulic fluid from the volume adjacent to the expansion chamber into the compression chamber of the shock absorber, which gives rise to the extension of the shock absorber rod over a certain length out of the cylinder, and therefore to an extension of the shock absorber, which resumes its normal length under static load, starting from which it is possible to start the rotor for the takeoff.

Advantageously, in this embodiment of the device, the controlled distributor is a three-position distributor, whose third position is a position of isolation of the return chamber of the accumulator with respect to the operating fluid supply and return ducts, in such a way that the distributor provides a safety locking of the return chamber, in particular when it is filled, this safety locking thus palliating possible failures of the controlled means of selective blocking.

Advantageously, the operating fluid circuit which can feed the return chamber of the accumulator by the intermediary of the distributor is a hydraulic circuit of the helicopter.

In an advantageously simple and practical embodiment, with regard to technology and implementation, the controlled means of selective blocking comprise at least one transfer electro-valve and its electrical control circuit, and the distributor is an electro-distributor, whose electrical control circuit is coupled to the electrical control circuit of the electro-valve, in such a way that the controls of the electro-valve and of the electro-distributor are synchronized by the operation of a single switch, simultaneously controlling the opening of the electro-valve from the closed rest position and the passage of the electro-distributor into the position of draining the return chamber of the accumulator.

Thus a single control action on the switch allows the simultaneous control of the draining of the return chamber of the accumulator and the opening of the inlet electro-valve to the transfer chamber of the accumulator, for the admission into the latter of the pressurized gas coming from the expansion chamber of the shock absorber.

Furthermore and advantageously, the single switch also simultaneously controls the opening of the electro-valve from the closed position of isolation of the transfer chamber, filled with gas, and the passage of the electro-distributor into the position of filling the return chamber of the accumulator.

Thus, by another single control action on the switch, the filling of the return chamber and the opening of the electro-valve is caused, allowing the draining of the transfer chamber and the return of the pressurized gas into the expansion chamber of the shock absorber.

Advantageously, in order to provide an automatic closing of the electro-valve after the filling of the transfer chamber with pressurized gas and the draining of the return chamber of the accumulator of operating fluid, the device also comprises an end of travel contactor, sensitive to the relative displacements of the shock absorber body and of the shock absorber rod, and controlling the closing of the electro-valve or, more generally, of the controlled means of selective blocking, when this contactor detects a position of maximum allowed penetration of the shock absorber rod in the shock absorber body, starting from the position under static load of the shock absorber, and due to a transfer of gas from the shock absorber into the transfer chamber of the accumulator.

Advantageously, in order to provide good synchronization of the controls of the controlled means of selective blocking and of the distributor, the end of travel contactor simultaneously controls the passage of the distributor into the position of isolation of the return chamber of the accumulator.

Furthermore, it is advantageous to produce the accumulator in such a way that its internal volume is sufficient for the transfer chamber to contain, in the position of draining of the return chamber, all of the volume of pressurized gas initially contained in the expansion chamber of the shock absorber in communication with the transfer chamber by the transfer duct. This characteristic allows the total elimination of the flexibility of the shock absorber over this volume of compressed gas, after its total transfer into the transfer chamber and after closure of the controlled means of selective blocking.

In order to facilitate, on the one hand, the connection of the shock absorber to the accumulator and, on the other hand, the initial inflation with compressed gas of the expansion chamber connected to the transfer chamber of the accumulator, it is advantageous for the transfer duct to comprise a T connector, fixed to the shock absorber, and connecting the expansion chamber in parallel to the controlled means of selective blocking and to a pressurized gas inflation valve, the controlled means and the inflation valve being directly fixed to the T connector.

In this case, in order to reduce the length of the transfer duct, it is advantageous for the accumulator to be intended to be directly fixed o the shock absorber, while the distributor and the supply and return ducts of the operating fluid circuit, and the essential parts of the electrical control circuits, when the controlled means of selective blocking comprise an electro-valve and when the distributor is an electro-distributor, are intended to be mounted on the helicopter, the distributor being connected to the accumulator by a flexible pipe.

In a second embodiment of the device according to the invention, simplified with respect to the first embodiment described above, and preferably intended to be used on a shock absorber which is already fitted with a retraction device, allowing a shortening of the shock absorber from its position under static load, in order to bring the undercarriage into an extra-lowered position, the device according to the invention is defined in that the volume of compressible fluid of the expansion chamber connected to the accumulator is a volume of pressurized gas housed in the return chamber of the accumulator, and separated by the separating piston of the latter from the incompressible fluid of the adjacent volume of this same expansion chamber, which is transferred from the shock absorber into the transfer chamber of the accumulator by compressing the return chamber, when the shock absorber is caused to compress, such that the closing of the controlled means of selective blocking, which are open in the rest condition, harden the shock absorber by isolating it from the pressurized gas in the return chamber.

Such a device allows, without substantially modifying a shock absorber already having a retraction capability, the adding of the function of elimination of the flexibility over the compressed gas chamber housed in the transfer chamber of the accumulator in order to increase the dynamic stability of the helicopter.

In this second embodiment, as the accumulator functionally constitutes the extension of the low pressure chamber of the shock absorber to the exterior of the latter, and across the controlled means of selective blocking, a valve for inflation with pressurized gas and a pressure probe are advantageously mounted on the accumulator, and open into an end section of the return chamber, on the side opposite to the separating piston, in order to respectively allow the inflation of the return chamber and the monitoring of the variation in the pressure in this chamber.

Also in this embodiment, the controlled means of selective blocking advantageously comprise, for reasons of simplification of embodiment and of control, a bistable electro-valve which is switched from its open position to its closed position by control pulses, supplied by a control contactor, for example a push-button control contactor, of its electrical control circuit.

In one embodiment, which is particularly appropriate for undercarriages which cannot be raised in flight, the accumulator is intended to be fixed to the shock absorber, while the contactor of the electrical control circuit of the electro-valve is intended to be fitted to the helicopter, and preferably on the flight control panel of the latter.

But in the case of an undercarriage which can be raised in flight, and in order that the presence of the accumulator may not constitute a hindrance to the operation of the undercarriage, the accumulator can be intended to be fixed on the helicopter and is connected to the shock absorber by a flexible duct.

The device according to the invention, for reducing the flexibility of an oleo-pneumatic suspension shock absorber for undercarriages, can be an additional device, which is added to a shock absorber already fitted to a helicopter undercarriage, and which is intended not to be uncoupled from the shock absorber again. But the device according to the invention can also be embodied in the form of an optional device, which is coupled to the shock absorber or which is uncoupled from the latter according to requirements. Finally, the device according to the invention can be combined from the beginning with an undercarriage suspension shock absorber or with the undercarriage in question.

Because of this, another subject of the invention is an oleo-pneumatic suspension shock absorber for an aircraft undercarriage, of the type comprising a shock absorber body, at least one shock absorber piston and at least one shock absorber rod mounted in a sliding and sealed manner in the body, and which define in the shock absorber at least one compression chamber, containing a substantially incompressible hydraulic fluid, and at least one expansion chamber containing at least one volume of hydraulic fluid adjacent to at least one volume of a compressible and pressurized fluid, and in communication with the compression chamber by the intermediary of throttling means, which delimit at least one throttling passage under compression of the hydraulic fluid expelled from the compression chamber into the adjacent volume of hydraulic fluid of the expansion chamber, when the shock absorber is caused to compress, and at least one throttling passage under expansion of the hydraulic fluid expelled from the adjacent volume of the expansion chamber into the compression chamber, when the shock absorber is caused to expand, the oleopneumatic shock absorber according to the invention being defined in that it also comprises a device for reducing its flexibility such as defined above.

If the shock absorber is of the type comprising two expansion chambers one of which comprises a high pressure gas chamber and the other of which comprises a low pressure gas chamber and is at least partially housed inside the shock absorber body, the transfer chamber of the accumulator is then advantageously connected by the transfer duct to the shock absorber body and opens into the section housed in this body of the expansion chamber having the low pressure gas chamber.

In an embodiment which is particularly advantageous with respect to the simplicity of structure, its compatibility with the structure of undercarriages appropriate for fitting to helicopters and to its compatibility with the device for reducing flexibility according to the invention, the body of the shock absorber comprises an external cylinder and an internal cylinder disposed substantially coaxially inside the external cylinder, both cylinders being closed by a base at their ends located on the same axial side, and open at their opposite ends, the shock absorber comprises a single hollow shock absorber rod, open at an end which is engaged between the two cylinders, having a closed base at its opposite end, and axially mounted in a sliding and sealed manner between the two cylinders, the throttling means are substantially disposed at the level of the open end of the internal cylinder and, in the rest condition, hydraulic fluid fills a compression chamber, delimited inside the rod, between its base and the throttling means, and is in communication through the throttling means with, on the one hand, a first expansion chamber, of annular shape, delimited by the rod between the two cylinders, and containing a volume of hydraulic fluid adjacent to the throttling means and to a low pressure gas chamber and, on the other hand, a second expansion chamber, delimited in the internal cylinder and containing a high pressure gas chamber and an adjacent volume of hydraulic fluid, which is isolated from the hydraulic fluid of the other chambers by a separating piston mounted in a sliding and sealed manner in the internal cylinder, the transfer duct to the accumulator opening through a connector into the end section of the annular expansion chamber which is adjacent to the base of the cylinders.

This shock absorber can be such that in the rest state, the low pressure gas chamber is also housed in the annular expansion chamber, in which case the device for reducing flexibility is a device according to the first preferred embodiment described above, simultaneously allowing the elimination of the elasticity over this low pressure gas chamber, and a retraction in length of the shock absorber, starting from its position under static load.

But it is also possible that in the rest condition the low pressure gas chamber is housed in the return chamber of the accumulator and is isolated from the adjacent hydraulic fluid in the annular expansion chamber and in the transfer chamber of the accumulator by the separating piston mounted in the latter, in which case the device for reducing flexibility is a device according to the second embodiment described above, providing the elimination of elasticity over the low pressure gas chamber without by itself allowing an additional retraction of the shock absorber.

Finally, a subject of the invention is an aircraft undercarriage, in particular a main undercarriage for a shipborne helicopter comprising a leg box linked with the structure of the aircraft, at least one member for contact with the ground, such as a wheel, and at least one oleopneumatic suspension shock absorber, connected to the leg box and to the member for contact with the ground, in such a way as to dampen the relative movements between this member and the leg box, the oleopneumatic shock absorber being a shock absorber according to the invention, fitted with a device for reducing flexibility also according to the invention.

In a preferred embodiment for use as a main undercarriage for ship-borne helicopters, the undercarriage is a direct sliding undercarriage, the body of its shock absorber simultaneously constituting the leg box, and the member for contact with the ground being carried by the end of the shock absorber rod which is external to the shock absorber body.

But it is also possible for the undercarriage according to the invention to be of the balance arm type, in which the member for contact with the ground is carried by the lower end of the leg box inclined and articulated by its upper end on the structure of the aircraft, the shock absorber being articulated by its body also on the structure of the aircraft and by the end of its rod, external to the shock absorber body, on the leg box, or another balance arm type in which the member for contact with the ground is carried by the lower end of a balance arm inclined and articulated by its upper end on the lower end of the leg box which is itself connected by its upper end to the structure of the aircraft, the shock absorber being articulated by its body on the leg box and by the end of its rod, external to the shock absorber body, on the balance arm.

Figure 4:
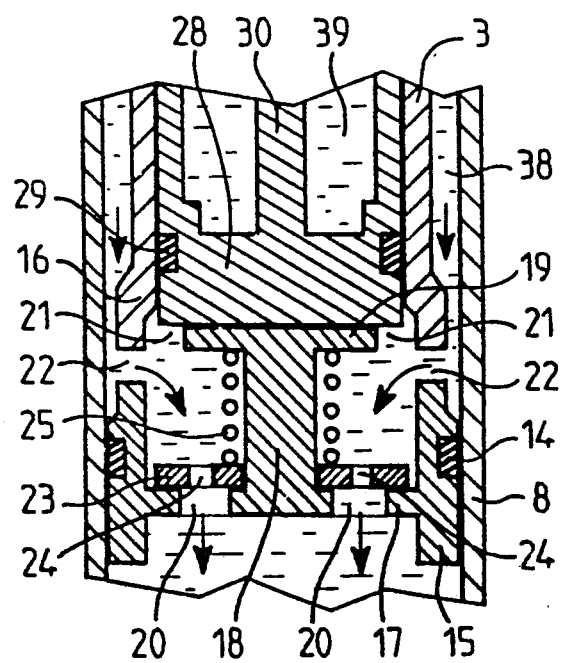
Figure 5:
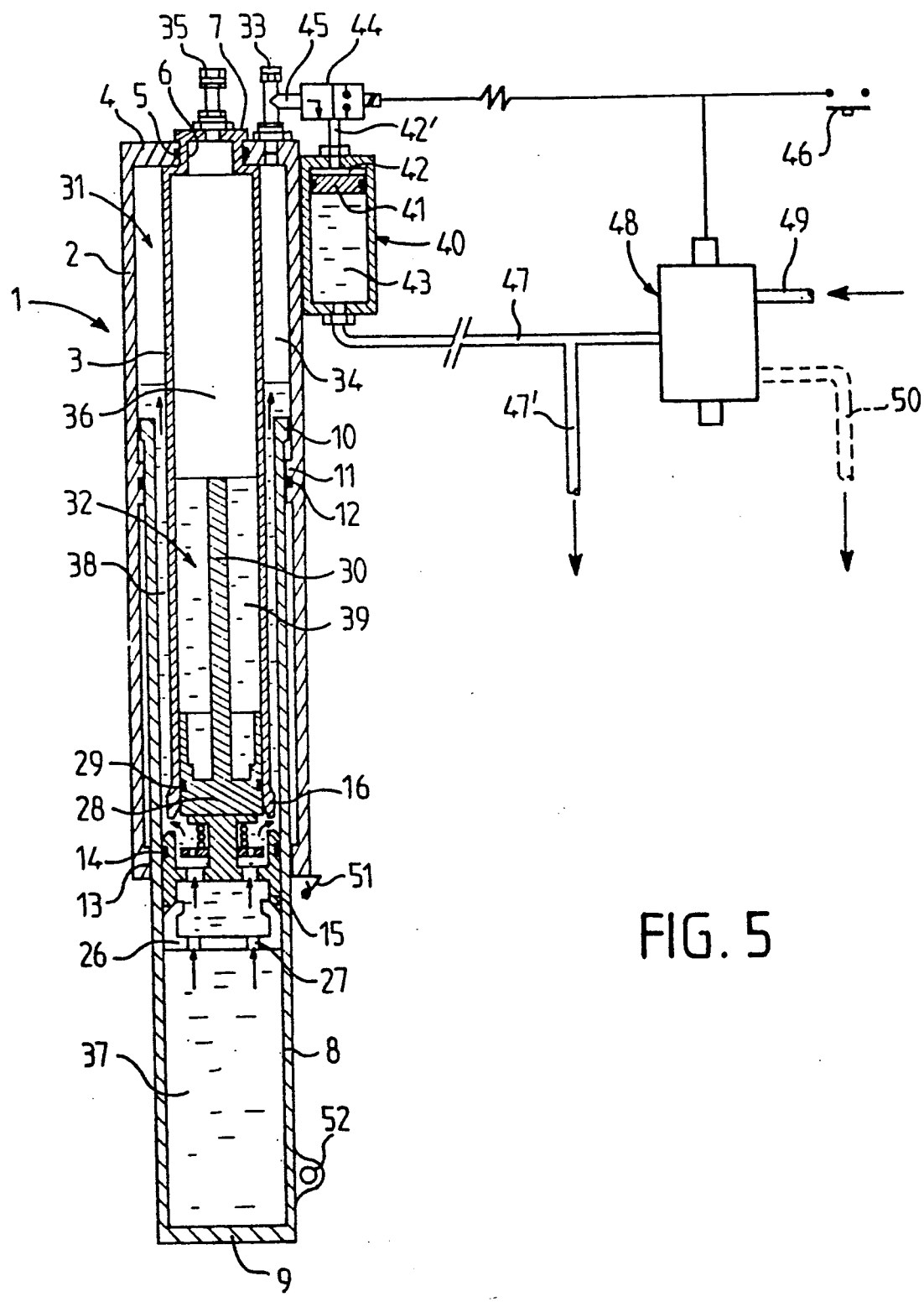
Figure 6:
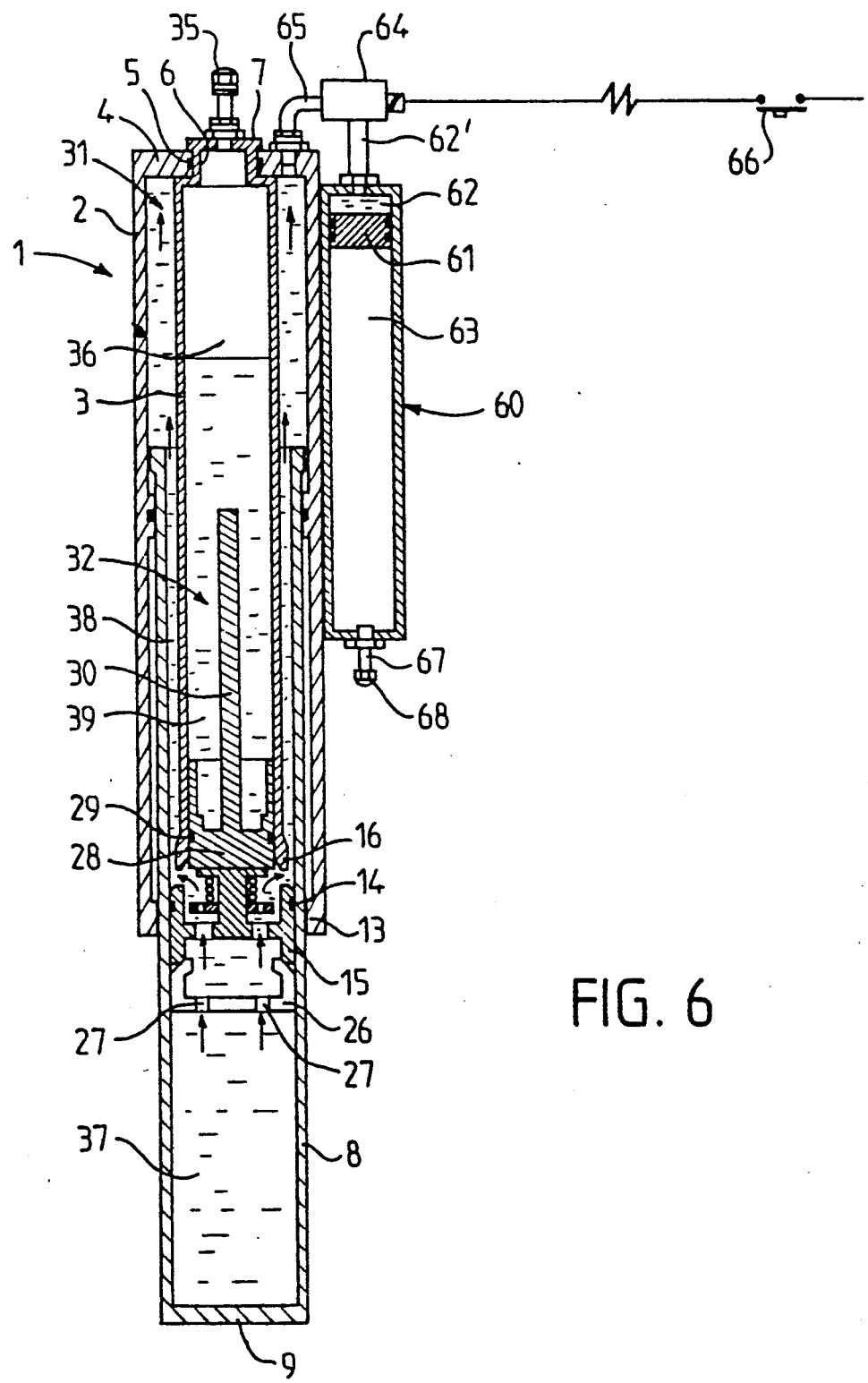

The invention will be better understood and other characteristics and advantages of the invention will appear on reading the description given below in a nonlimitative way of two embodiments obtained from the same basic oleo-pneumatic shock absorber structure, and with reference to the appended drawings in which:

FIG. 1 shows a diagrammatic axial cross-section of an oleo-pneumatic shock absorber having two gas chambers at the start of its compression phase, on landing, starting from its maximum extension position, FIG. 2 shows, in a cross-section similar to that of FIG. 1, the shock absorber of FIG. 1 at the end of the compression, phase, and near its equilibrium position under static load, FIGS. 3 and 4 show, at a larger scale, a part of the shock absorber of FIGS. 1 and 2, and showing the positions occupied by the compression and expansion throttling means respectively of the shock absorber, FIG. 5 shows the shock absorber of FIG. 1 on which there is mounted a first example of a device for reducing flexibility, and FIG. 6 shows the shock absorber of FIG. 1 on which there is mounted a second example of a device for reducing its flexibility.

With reference to FIGS. 1 to 4, the oleopneumatic suspension shock absorber of a main undercarriage for ship-borne helicopters comprises a body 1, constituted from two cylindrical tubes 2 and 3, of different cross-sections, disposed substantially coaxially one inside the other and substantially of the same length. The two cylinders 2 and 3 are closed at their upper ends, the external cylinder 2 by an annular base 4 surrounding in a sealed manner, by means of a static sealing gasket 5, the upper end section of smallest cross-section 6 of the internal cylinder 3, this section 6 itself being closed by a base 7, and connected to the rest of the internal cylinder 3 by a shoulder bearing against the annular base 4 of the external cylinder 2. The two cylinders 2 and 3 of the body 1 are open at their lower ends.

The shock absorber also comprises a rod 8, which is tubular, cylindrical, closed at its lower end by a base 9, and open at its upper end, which is engaged between the two cylinders 2 and 3 of the body 1 and conformed as an annular piston 10, radially protruding towards the exterior, in order to provide guidance, against the internal surface of the external cylinder 2, of the rod 8 mounted in an axially sliding manner in the body 1, between the two cylinders 2 and 3 of the latter. The guidance of the rod 8, sliding in a sealed manner in the body 1, is furthermore provided by a cylindrical bearing 11, radially protruding inwards on the internal surface of the external cylinder 2, substantially at midheight of this cylinder 2. This guidance bearing 11 is provided with a dynamic sealing gasket 12 which works in conjunction with the external lateral surface of the upper section of the rod 8 which is engaged between the two cylinders 2 and 3. At the level of the lower ends of the cylinders 2 and 3, the sealed guidance of the rod 8 is also provided by a cylindrical bearing 13, radially protruding inwards at the lower end of the external cylinder 2, and by an opposite dynamic sealing gasket 14, disposed in a circular groove produced in the lateral external surface of a cylindrical sleeve 15, integral with the lower end 16 of the internal cylinder 3, while being of an external diameter greater than that of this lower end 16, itself having an excess thickness with respect to the thickness of the cylinder 3, the sleeve 15 substantially extending towards the bottom of the internal cylinder 3 and surrounding throttling means described below. In its section which penetrates inside the body 1, the rod 8 slides by its lateral external surface against the bearing 13 of the external cylinder 2 and by it internal lateral surface against the external lateral surface of the sleeve 15 bearing the dynamic sealing gasket 14.

Thus, the volumes delimited inside the rod 8, inside the internal cylinder 3, and between the two cylinders 2 and 3 and above the bearing 11, are volumes which are isolated in a sealed manner from the exterior of the shock absorber.

The sleeve 15 is integral with the lower end 16 of the internal cylinder 3 by a transverse wall 17, being a single part with the central and axial core 18 fixed to the lower end 16 by an upper transverse wall 19. The transverse walls 17 and 19 are each pierced with axial orifices 20 and 21 respectively (see FIGS. 3 and 4), while radial passages 22 are provided between the lower end 16 of the internal cylinder 3 and the sleeve 15. Furthermore, a diaphragm 23, constituted from an annular disk mounted in a sliding manner axially around the central core 18 and inside the sleeve 15, between the transverse walls 17 and 19, and pierced with axial orifices 24 opposite the orifices 20 of the transverse wall 17, but of smaller cross-section than these orifices 20, is applied against the transverse wall 17, forming a seat for this diaphragm-valve 23, by means of a coil spring 25 fitted around the central core 18 and bearing, on the one hand, against the upper transverse wall 19 and, on the other hand, against the diaphragm-valve 23.

The throttling means thus constituted, and whose functioning is described below, are completed by a throttling cup 26, disposed in the rod 8, under the sleeve 15, this cup 26 having a transverse base pierced by axial orifices 27 forming permanent throttling orifices.

The structure of the shock absorber is completed by the presence of a separating piston 28 mounted in a sliding and sealed manner inside the internal cylinder 3, by means of a dynamic sealing gasket 29 mounted on this separating piston 28 which comprises an axial tail 30 directed towards the upper base 7 of the internal cylinder 3.

The volumes inside the shock absorber and isolated from the exterior are filled with a hydraulic fluid with the exception of the upper section of the annular chamber 31, delimited between the two cylinders 2 and 3 and inside the section of the rod 8 inside the body 1, up to the radial passages 22, and with the exception of the upper section of the chamber 32 inside the internal cylinder 3, between the base 7 of the latter and the separating piston 28. In fact, the upper section of the annular chamber 31 is filled with a volume of gas, such as nitrogen, introduced under low pressure through the base 4 of the external cylinder 2 by means of an inflation valve 33, in order to form, in the upper section of the chamber 31, a low pressure gas chamber 34. Similarly, a volume of gas, for example nitrogen, is introduced, but under high pressure, into the upper section of the chamber 32, through the base 7 of the internal cylinder 3, by means of another inflation valve 35, in order to form a high pressure pneumatic chamber 36.

An oleo-pneumatic shock absorber is thus obtained whose rod 8 contains a hydraulic fluid chamber 37, between the base 9 and the throttling means, and called a compression chamber, as the hydraulic fluid which it contains is compressed when the shock absorber is caused to compress, in a direction which tends to make the rod 8 enter into the body 1. The latter contains a low pressure expansion chamber 31, and a high pressure expansion chamber 32, each comprising a gas chamber, a low pressure gas chamber 34 and a high pressure gas chamber 36 respectively, adjacent to a volume of hydraulic fluid 38 and 39 respectively, the volume 38 extending to the radial orifices 22 and the volume 39 being separated from the axial orifices 21 only by the separating piston 28, which is applied in the rest condition, in the initial position, butted against the transverse wall 19 fixed to the lower end 16 of the internal cylinder 3, under the effect of the thrust resulting from the high pressure gas chamber 36, which tends to expand, as doesn the low pressure gas chamber 34, which has the effect of returning the hydraulic fluid towards the interior of the rod 8, and thus tends to drive the latter to a maximum degree out of the shock absorber body 1.

The shock absorber whose structure has just been described operates in the following way: starting from the position of maximum extension shown in FIG. 1, which is that occupied by the shock absorber on an extended main undercarriage, if it is one which can be raised, or fixed in the landing position, the landing or flight-deck landing phase takes place as follows. Initially, the member for contact with the landing deck surface, in general a wheel, supported directly or indirectly by the lower end of the rod 8, touches this surface, and the structure of the helicopter presses on the body 1 in such a way that the rod 8 begins to penetrate into the body 1. The volume of the compression chamber 37 reduces, and hydraulic fluid compressed in this chamber 37 is expelled into the volume 38 of the low pressure expansion chamber 31, being braked and throttled through the permanent throttling orifices 27 in the cup 26, then through the orifices 20 by raising the diaphragmvalve 23 against the spring 25 and flowing between this diaphragm-valve 23 and the sleeve 15, then through the radial orifices 22 as far as the volume 38. The increase of this volume 38 of hydraulic fluid in the expansion chamber 31 gives rise to an increase in the pressure of the gas in the low pressure chamber 34. During this compression phase, the diaphragm-valve 23 has no effect on the throttling of the hydraulic fluid since it is raised from its seat 17.

If the vertical accelerations on flight-deck landing are relatively low, the compression stops when the force applied by the pressurized gas in the low pressure chamber 34 on the hydraulic fluid balances the load of the helicopter on the wheel of the corresponding undercarriage. In this case, only the low pressure chamber 34 works.

On the other hand, if the vertical accelerations on flight-deck landing are large, the body 1 of the shock absorber continues to progress over the rod 8, and when the pressure of the gas chamber 34 becomes equal to the pressure of the high pressure gas chamber 36, the separating piston 28 is pushed by the hydraulic fluid towards the top in the internal cylinder 3 and compresses the nitrogen in the high pressure chamber 36. In this case, a portion of the hydraulic fluid expelled from the compression chamber 37 flows as before through the radial orifices 22 towards the volume 38, while another portion flows through the axial orifices 21 towards the interior of the internal cylinder 3 while pushing the separating piston 28 back. In this case, the quantity of compressed gas increases in such a way that the compression ratio of the shock absorber reduces. In effect, the high pressure chamber 36 increases the capacity of the shock absorber to be compressed under limited pressure.

In a second period, when the load on the wheel reverses or reduces, the shock absorber expands under the action of the energy stored in the compressed gas of the chamber 34 and possibly of the chamber 36. In fact, the pressurized nitrogen in the low pressure 34 and high pressure 36 chambers act as a spring, storing the energy during compression and restoring it during the expansion. Because of this, in the expansion phase, the gas pushes the hydraulic fluid into the compression chamber 37, whose volume increases, the circulation of hydraulic fluid takes place through the radial orifices 22 and, possibly, the axial orifices 21 then through the calibrated orifices of small cross-section 24 of the diaphragm-valve 23 applied against its seat 17, then finally through the permanent throttling orifices of the cup 26. Because of the passage through the small orifices 24 of the diaphragm-valve 23, the throttling during expansion is greater than during compression, which provides a braking of the shock absorber in expansion. The expansion of the shock absorber, resulting in an extension of the rod 8 from the body 1, stops when the load of the helicopter on the corresponding wheel of the undercarriage balances the force applied by the compressed gas on the hydraulic fluid. The shock absorber is then in the position known as the position under static load.

FIG. 1 shows the position of the various components of the shock absorber at the start of a compression phase, while FIG. 2 shows the shock absorber substantially at the end of a compression phase, during a flight-deck landing with a large vertical acceleration, such that the high pressure gas chamber 36 is acted upon by the displacement of the separating piston 28. In these figures, as in FIGS. 3 and 4, the direction of the forces applied to the shock absorber and the direction of displacement of the hydraulic fluid have been indicated by arrows, FIG. 3 clearly showing the structure and positions of the component parts of the throttling means during the compression phase, while FIG. 4 shows the structure and positions of the same components in the expansion phase.

It is noted that in this shock absorber the gas is in contact with the hydraulic fluid in the depression chambers 31 and 32, which is possible because the shock absorber body 1 is in a high position with respect to the rod 8. On the other hand, if the shock absorber had to be used in the reverse position, rod 8 towards the top and body 1 towards the bottom, it would then be appropriate to separate the gas chambers 34 and 36 from the adjacent volumes of hydraulic fluid 38 and 39 by separating pistons.

FIG. 5 shows the shock absorber of FIGS. 1 to 4 fitted with a first embodiment of a device for reducing the elasticity of the shock absorbing, which corresponds to the best embodiment of this device known to the applicant at the present time.

This device comprises a valve type accumulator 40, which is sealed and fixed, preferably in a removable manner, by means of fixings which are not shown, against the exterior of the upper section of the shock absorber body 1. A separating piston 41, mounted in a sliding and sealed manner inside the accumulator 40, subdivides the latter into two chambers 42 and 43 isolated from each other and whose volumes vary in opposite ways by the displacement of the separating piston 41. The upper chamber 42, called the transfer chamber, is connected by a transfer duct 42, to an input of a two way electrovalve 44, which has two positions and is of the bistable type, i.e. stable in each of its two positions, and which is connected by its other input to an end of a T connector 45, which supports the electro-valve 44. A second end of the T connector 45 is fitted with the inflation valve 33, provided in FIGS. 1 and 2 for inflating the low pressure gas chamber 34, the third end of the T connector 45 being mounted on the base 4 of the external cylinder 2 of the shock absorber body 1, in order to simultaneously allow this inflation and the putting into communication of this low pressure gas chamber 34 with the electro-valve 44. The latter is closed in the rest condition, i.e. it isolates the chamber 42 in the accumulator 40 from the low pressure ga chamber 34 in the shock absorber 1. This electrovalve 44 can be switched from its stable closed position to its stable open position by electrical control pulses supplied by its electrical control circuit comprising a switch 46 produced in the form of a push-button contactor, disposed in the flight control panel of the helicopter.

The lower chamber 43 of the accumulator, called the return chamber, is connected by a flexible pipe 47 to an input of an electro-distributor 48 having three ways and three stable positions. This electro-distributor 48 is mounted on the structure of the helicopter and is connected, by a second way, to a duct for the supply of pressurized hydraulic fluid 49 of a hydraulic circuit of the helicopter, while its third way is connected to a duct 50 for returning this hydraulic fluid to a reservoir of this hydraulic circuit. The electro-distributor 48 is stable in each of its 3 positions, one of which is a position for supplying the return chamber 43, in which the pipe 47 is put into communication with the supply duct 49 for pressurized hydraulic fluid, a second position of the electro-distributor 48 being a position for draining the return chamber 43, in which the pipe 47 is put into communication with the return duct 50, and the third position of the distributor 48 is an isolating position, in which the pipe 47 is isolated from the supply and return ducts 49 and 50. The electrical control circuit of the electro-distributor 48 is partly common to that of the electro-valve 44 and in particular also comprises the push-button contactor 46, such that the controls of the electro-valve 44 and of the distributor 48 are synchronized. The pipe 47 has a branch 47' connected, under the same conditions, to the return chamber of the accumulator mounted on the shock absorber fitted to the second main undercarriage of the helicopter.

Finally, in order to complete the synchronized control of the electro-valve 44 and the electrodistributor 48, their electrical control circuit also comprises an end of travel contactor 51 mounted at the lower end of the external cylinder 2 of the shock absorber body 1. This end of travel contactor 51 supplies electrical control pulses to the electro-valve 44 and to the electro-distributor 48 when it is operated by a stop 52, radially protruding towards the exterior on the lower end section of the rod 8.

The shock absorber fitted with this device functions in the following manner. With the helicopter in flight and the undercarriages being extended or fixed in the landing position, the electro-valve 44 is in the closed rest condition, such that the low pressure gas chamber 34 is entirely housed inside the expansion chamber 31 of the shock absorber and, in the accumulator 40, the transfer chamber 42 is empty while the return chamber 43 is filled with hydraulic fluid of the helicopter circuit, the separating piston 41 being maintained in the high position by the fact that the electro-distributor 48 occupies its isolating position, thus providing a hydraulic safety locking for the electro-valve 44.

When the helicopter touches down, the shock absorber functions as previously described with reference to FIGS. 1 to 4, until it assumes its position under static load, in which the nitrogen of the low pressure chamber 34 is compressed, because of a certain penetration of the rod 8 inside the shock absorber body 1.

The normal functioning of the shock absorber is not therefore changed up to this point.

By operating the push-button contactor 46, the pilot then simultaneously controls the switching of the electro-valve 44 from its closed position to its open position, and the changing of the electro-distributor 48 from its isolating position to its position of draining the return chamber 43, by putting the latter into communication with the return duct 50 by the pipe 47. The opening of the electro-valve 44 simultaneously allows the transfer of the compressed gas of the low pressure chamber 34 into the transfer chamber 42 of the accumulator 40, whose separating piston is pushed back towards the bottom, emptying the return chamber 43. Because of the transfer of compressed gas from the chamber 34 of the shock absorber into the transfer chamber 42 of the accumulator 40, and as the shock absorber is under static load, the rod 8 can continue to penetrate into the body 1, until the stop 52 carried by the rod 8 operates the end of travel contactor 51. The latter then supplies electrical control pulses to the electro-valve 44, which is switched from its open position to its stable closed position, and to the electro-distributor 48, which from its stable draining position to its stable isolating position. The position of the stop 52 on the rod 8 is calculated such that the stop 52 operates the end of travel contactor 51 when all of the nitrogen from the low pressure chamber 34 has been transferred into the transfer chamber 42 of the accumulator 40. After the closing of the electro-valve 44 and the isolation of the distributor 48, the shock absorber is without a low pressure gas chamber, and now offers the possibility of reduced travel only, by compression or expansion of the high pressure gas chamber 36, such that the shock absorber has become very hard.

All of the components of the device being in the rest condition, the helicopter can be stored without particular supervision in this extra-lowered position, in which the flexibility over the low pressure chamber has been eliminated.

The static stability has thus been improved, by lowering the center of gravity of the helicopter, obtained by the shortening of the shock absorbers from their position under static load, and the dynamic stability has been improved by the elimination of flexibility over the low pressure gas chamber.

In order to return the helicopter to the normal position, under static load, hydraulic assistance is necessary. From the flight control panel, the contactor 46 is operated, which controls the change of the distributor 48 from its isolation position to its position for supplying the return chamber 43, which is thus supplied with hydraulic fluid under pressure. Simultaneously, the electro-valve 44 is switched to the open position, such that by the effect of the filling of the chamber 43, and the displacement of the separating piston 41, the transfer chamber 42 of accumulator 40 is emptied, and the gas contained in the latter is transferred into the expansion chamber 31 of the shock absorber, in order there to reconstitute the low pressure gas chamber 34. The reinflation of the low pressure gas chamber in the shock absorber displaces the hydraulic fluid towards the chamber 37 in the rod 8, in such a way that the latter extends from the shock absorber body 1 until it returns to the position of the shock absorber under static load, starting from the extra-lowered position. When the separating piston 41 reaches its high position in the accumulator 40 the electro-valve 44 is switched into the rest and closed position, and the distributor 48 moves to the isolation position, such that it maintains the pressure in the return chamber 43, which constitutes a safety hydraulic locking against a possible failure of the electro-valve 44.

The shock absorber is once again in its normal functioning configuration, with all of the components in the rest condition.

The mode of action of this device therefore consists in evacuating nitrogen from the low pressure chamber of the shock absorber into an accumulator which is external to the latter, then in providing a locking over the nitrogen thus transferred, in order simultaneously to increase the hardness of the shock absorber and to substantially lower the center of gravity of the helicopter.

Furthermore, because of the branch connection of the pipes 47 and 47' connecting the distributor 48 to the two accumulators each mounted on the shock absorber of each of the two main undercarriages, this embodiment has the advantage of providing an automatic control of the standing attitude of the helicopter, at the price of the size of the pipes 47 and 47' which is reduced.

FIG. 6 shows a second embodiment of a device for reducing dampening flexibility installed on the shock absorber of FIGS. 1 to 4, whose structure is retained, but whose filling conditions are slightly modified.

In fact, an external accumulator 60 appears again, fixed against the exterior of the upper section of the shock absorber body 1, and in which a separating piston 61, axially mounted in a sliding and sealed manner, isolates from each other a transfer chamber 62 and a return chamber 63, under the separating piston 61, and into which has been transferred the low pressure gas chamber of the shock absorber. This volume of low pressure gas is inflated in the return chamber 63 through an inflation valve 67, mounted at the lower end of the accumulator 60, and provided with a pressure probe 68. Because of this arrangement of the low pressure gas chamber 63 in the lower chamber of the accumulator 60, the piston 61 is pushed upwards, in such a way as to reduce the volume of the transfer chamber 62, in communication with the annular chamber 31 of the shock absorber by the transfer duct 62', a bistable electro-valve 64 having two positions and two ways, and an elbow connector 65 opening into the annular chamber 31. In the rest condition, the electro-valve 64 is open and the filling of the shock absorber with hydraulic fluid is such that the volume of hydraulic fluid 38 of the low pressure expansion chamber occupies the entire annular chamber 31, and a residual volume in the transfer chamber 62 by the intermediary of the elbow connector 65, of the electro-valve 64 and of the transfer duct 62'.

As in the previous example, the push-button control contactor 66 of the electrical circuit of the electro-valve 64 is mounted in the flight control panel of the helicopter.

The functioning of the shock absorber fitted with this second embodiment of the device is as follows. With the helicopter in flight, the undercarriages extended or fixed in the landing position with their shock absorbers extended the electro-valve 64 is in the open rest state and the hydraulic fluid of the volume 38 is adjacent to the low pressure nitrogen in the chamber 63 by the intermediary of the separating piston 61. When the helicopter touches down, the hydraulic fluid is expelled from the compression chamber 37 into the volume 38 in such a way that the hydraulic fluid of this volume 38 passes from the annular chamber 31 of the shock absorber into the transfer chamber 62 of the accumulator 60 and thus compresses the nitrogen in the chamber 63 by pushing the separating piston 61 towards the bottom in the accumulator 60. If the flight-deck landing is gentle, the high pressure gas chamber 36 does not intervene, and if the cross-section of the accumulator 60 is the same as that of the annular chamber 31, the shock absorbing characteristics are unchanged.

When the shock absorber is in the static position, with a certain penetration of the rod 8 into the body 1, and a corresponding displacement of the separating piston 61 towards the bottom, in the accumulator 60, operating the push-contactor 66 controls by a pulse the switching of the electro-valve 64 from its stable open position to its stable closed position. The shock absorber is thus isolated from its low pressure gas chamber 63, by a blockage over the hydraulic fluid in the electro-valve 64. But the elasticity characteristics of the high pressure gas chamber 36 are unchanged. There is therefore elimination of elasticity solely in the low pressure gas chamber. All of the elements of the device being in the rest condition, the helicopter can be stored in this position without particular supervision.

In order to bring the shock absorber into its normal configuration, a new electrical control pulse for the electro-valve 64 caused by operating the contactor 66 controls the switching of the electro-valve 64 from its closed position to its open position, which reestablishes the communication between the low pressure gas chamber 63 in the accumulator 60 and the adjacent volume of hydraulic fluid 38 in the low pressure expansion chamber 31 of the shock absorber.

It is noted that the second embodiment in FIG. 6, with blockage over the hydraulic fluid, is technically simpler than the first embodiment with blockage over the gas because it does not involve any intervention of a hydraulic circuit of the helicopter. Furthermore, it is easier to achieve sealing in the blockage of the electro-valve 64 on the hydraulic fluid than a sealing on the blockage of the electro-valve 44 on a gas such as nitrogen.

However, this second embodiment, which consists in transferring the low pressure gas chamber from the shock absorber into an external accumulator, then in isolating by an electro-valve the hydraulic communication between the shock absorber and this accumulator, does not allow a shortening of the shock absorber with respect to its position under static load to be provided and therefore does not allow extra lowering of the helicopter.

Consequently, this second embodiment of the device is advantageously used on shock absorber-jacks, for example of the type of those described in the above mentioned French patents.

In a variant of the second embodiment shown in FIG. 6, the accumulator 60 is not fixed directly to the body 1 of the shock absorber, but is mounted on the structure of the helicopter, and its transfer chamber 62 is connected to the electro-valve 64 by a flexible pipe.

But in these various embodiments, it is always possible to completely eliminate the elasticity of the low pressure gas chamber, in such a way that the shock absorber is stiffened to the point that it thus becomes practically as hard as if it were mechanically butted.

The integration of a shock absorber according to either of FIGS. 5 or 6 into a main helicopter undercarriage can be provided in practice without substantial modification of the undercarriage itself.

According to one embodiment of an undercarriage which is advantageously suitable for ship-borne helicopters, and with reference again to FIG. 1, the undercarriage can be of the type called "direct sliding", and can comprise an undercarriage leg whose box is directly constituted by the external cylinder 2 of the shock absorber body 1, while the lower end of the rod 8 is extended, as shown in dotted and dashed lines, by a fork 70 supporting an axle 71 on which is mounted a wheel 72 for contact with the ground. Conventionally the rotation of the rod 8 with respect to the body 1, and about their common axis, can be prevented by a caliper, diagrammatically represented by the axes 75 of its two arms one articulated with the other and whose lower arm is articulated on an attachment 73 protruding towards the exterior from the lower end of the rod 8, while the upper arm is also articulated on a similar attachment 74 protruding towards the exterior and on the same side on the lower end of the external cylinder 2.

This undercarriage can be one which cannot be raised, fixed in the deck-landing position by its body 1 to the structure of the helicopter, or it can be one which can be raised in flight, in which case a fork 76 for pivoting on a shaft integral with the structure of the helicopter is for example provided on the upper end of the external cylinder 2, and an attachment 77 is also provided on the latter, for example at mid-height, for the connection to the body 1 of one end of an operating or possibly bracing hydraulic jack, whose other end is linked with the helicopter structure, in order to control the pivotings and raisings or lowering of the undercarriage.

It is also possible for the undercarriage to be of the so-called "balance arm" type, whose balance arm is constituted directly by the leg box, which is inclined and articulated by its upper end on the structure of the helicopter. The wheel is then mounted on the lower end of the balance arm, on the central section of which there is articulated the lower end of the rod 8, while the upper end of the body 1 is articulated on the helicopter. If the undercarriage can be raised, the raising and lowering operations can be provided by a jack articulated on the one hand on the helicopter and on the other hand on the balance arm, or integrated in the shock absorber in the form of a shock absorber-jack.

The undercarriage can finally be of another so-called "balance arm" type in which an inclined balance arm is articulated by its upper end on the lower end of an undercarriage leg box which is itself linked by its upper end to the structure of the helicopter. The wheel is carried by the lower end of the balance arm, and the shock absorber is articulated, by the lower end of its rod 8 on the balance arm, and by the upper end of its body 1 on the leg box. In this case also, if the undercarriage can be raised, an operating jack separated from the shock absorber or integrated with the latter can be provided In the case in which the undercarriage is fitted with a shock absorber with a device for reducing flexibility according to FIG. 6, and if the volume of the accumulator 60 fixed to the body constitutes an interference to the raising of the undercarriage, it is advantageous for the device for reducing flexibility to be a removable and optional device which is then mounted on the shock absorbers while prohibiting their raising. In fact, missions carried out by ship-borne helicopters from ships are very often carried out with extended undercarriages, and it is in this type of use that this prohibition is the least penalizing. It suffices to remove the optional device in order to regain a configuration in which the undercarriage can be raised, on condition that the shock absorber is reconditioned by reinflating its low pressure gas chamber 34 in its annular chamber 31.

For both embodiments, applied to a helicopter of unloaded average tonnage in the order of two tonnes for an additional weight estimated at 5 kg per undercarriage, a gain in stability is obtained which is, on stable ground, approximately 4.5 m/s, or a resistance to a lateral wind of approximately 28 m/s, and dynamically, in the order of 6.5 m/s, giving a resistance to a lateral wind in the order of 18 m/s.

We claim:

1. A device for reducing the flexibility of an oleopneumatic suspension shock absorber for aircraft undercarriages, in particular for ship-born helicopters, of the type comprising a shock absorber body, at last one shock absorber piston, and at least one shock absorber rob mounted in a sliding and sealed manner in the body, and which define in the shock absorber at least one compression chamber containing a substantially incompressible hydraulic fluid, and at least two expansion chambers, each containing at least one volume of hydraulic fluid adjacent to at least one volume of a fluid which is compressible under pressure, the compressible volumes of the two expansion chambers being initially pressurized at different pressures, a lower pressure and a higher pressure, wherein said at least one volume of hydraulic fluid disposed within the expansion chamber having the lower pressure compressible volume is in communication with the compression chamber by an intermediary of throttling means, which delimit at least one throttling passage under compression of the hydraulic fluid expelled from said compression chamber into said adjacent volume of hydraulic fluid of the expansion chamber having the lower pressure compressible volume when the shock absorber is caused to compress, and at least one throttling passage under expansion of the hydraulic fluid expelled from said adjacent volume of said expansion chamber into said compression chamber, when the shock absorber is caused to expand, the device being defined in that it comprises:

at least one sealed accumulator which is external to the shock absorber, at least one separating piston mounted in a siding and sealed manner in said accumulator, in such a way as to delimit in the latter two chambers of oppositely variable volume, isolated from each other, one of which is a transfer chamber and the other of which is a return chamber, at least one transfer duct, connecting said transfer chamber of the accumulator to the expansion chamber having the compressible fluid pressurized at the lower pressure, and means for insulating the compressible volume which has been pressurized at the lower pressure, from the accumulator, said means comprising controlled means for selectively blocking said transfer duct, said controlled means being maneuverable between two positions, one of which is a duct open position, allowing the transfer of at least a part of said compressible volume at the lower pressure from said expansion chamber of the shock absorber, when the latter is loaded in compression, into said transfer chamber of the accumulator, or the return of the fluid from said transfer chamber of the accumulator into said expansion chamber of the shock absorber, when the latter is caused to expand, and the other of which is a duct closed position isolating said expansion chamber of the shock absorber from said accumulator in which said volume of compressible fluid is at least partially retained.

2. The device as claimed in either of claim 1, for a shock absorber having at least one expansion chamber (31) of which a compressible fluid volume, formed by a chamber of pressurized gas (34) and an adjacent volume of hydraulic fluid (38) are housed in the said body (1) and/or the said shock absorber rod (8), wherein the said duct (42') connects the said transfer chamber (42) of the accumulator (40) to the said pressurized gas chamber (34), such that the pressurized gas is transferred from the said expansion chamber (31) to the said transfer chamber (42) and fills the latter when the shock absorber is caused to compress and after opening the controlled means of selective blocking (44), which are closed in the rest state, for the normal functioning of the shock absorber, and after filling the said transfer chamber (42) with pressurized gas in order to harden the shock absorber, and wherein the said return chamber (43) of the accumulator (40) is connected to an operating fluid circuit distributor (48) comprising a duct (49 for the supply of pressurized operating fluid and a duct (50) for the return of the operating fluid to a reservoir, the said distributor (48) being a controlled distributor having at least three ways and at least two positions, one of which is a draining position, connecting the said return chamber (43) to the return duct (50), and allowing the draining of the said return chamber (43) of operating fluid in order to allow the filling of the said transfer chamber (42) with compressed gas after the opening of the controlled means (44) of selective blocking, and of which the other is a position of filling the said return chamber (43), connecting the latter to the said pressurized operating fluid supply duct (49), and allowing the filling of the return chamber (43) with pressurized operating fluid in order to provide the draining of the said transfer chamber (42), and the return of the pressurized gas into the expansion chamber (31) of the shock absorber, after opening the said controlled means of selective blocking (44).

3. The device as claimed in claim 2, wherein the said controlled distributor (48) is a three position distributor, whose third position is a position of isolation of the said return chamber (43) with respect to the operating fluid supply and return ducts (49, 50), the said isolation position providing a safety locking of the said return chamber (43), at least when the latter is filled.

4. The device as claimed in claim 2 wherein the said operating fluid circuit (48, 49, 50) is a hydraulic circuit of the aircraft.

5. The device as claimed in claim 2, wherein the controlled means of selective blocking comprise at least one transfer electro-valve (44) and its electrical control circuit (46) and the said distributor (48) is an electro-distributor whose electrical control circuit is coupled to the electrical control circuit of the electro-valve (44), in such a way that the controls of the electro-valve (44) and of the electro-distributor (48) are synchronized by the operation of a single switch (46), simultaneously controlling the opening of the electro-valve (44) from its closed rest position, and the passage of the electro-distributor (48) into the position of draining the said return chamber (43).

6. The device as claimed in claim 5, wherein the single switch (46) also simultaneously controls the opening of the electro-valve (44) from its closed position of isolation of the transfer chamber (42) filled with gas, and the passage of the electro-distributor (48) into the position of filling the said return chamber (43).

7. The device as claimed in claim 3, which also comprises an end of travel contactor (51), sensitive to the relative displacements of the shock absorber body (1) and of the shock absorber rod (8), and controlling the closing of the said controlled means of selective blocking (44) when it detects a position of maximum allowed penetration of the shock absorber rod (8) in the body (1), starting from a position under static load of the shock absorber, and due to a transfer of gas from the shock absorber into the transfer chamber (42) of the accumulator (40).

8. The device as claimed in claim 7, wherein the said end of travel contactor (51) simultaneously controls the passage of the distributor (48) into the position of isolation of the said return chamber (43).

9. The device as claimed in claim 2, wherein the internal volume of the accumulator (40) is sufficient for the said transfer chamber (42) to contain all of the gas of the expansion chamber (31) of the shock absorber, in the position of draining of the return chamber (43).

10. The device as claimed in claim 2, wherein the transfer duct comprises a T connector (45), fixed to the shock absorber, and connecting the said expansion chamber (31) of the shock absorber in parallel to the said controlled means of selective blocking (44) and to a valve (33) for inflation with pressurized gas, the said means and the said valve being directly fixed to the T connector (45).

11. The device as claimed in claim 2, wherein the said accumulator (40) is intended to be fixed on the shock absorber (1, 8) while the said distributor (48) and the supply and return ducts (49, 50) of the said operating circuit are intended to be mounted on the aircraft, the distributor (48) being connected to the accumulator (40) by a flexible pipe (47).

12. The device as claimed in claim 1, wherein the volume of compressible fluid of the said expansion chamber (31) connected t the accumulator (60) is a volume of pressurized gas housed in the said return chamber (63) of the accumulator (60), and separated by the separating piston (61) of the latter from the incompressible fluid (38) of the adjacent volume of the said expansion chamber (31), which is transferred from the shock absorber into the transfer chamber (62) by compressing the return chamber (63) when the shock absorber is caused to compress, the closing of the controlled means of selective blocking (64), which are open in the rest condition, hardening the shock absorber by isolating it from the pressurized gas in the return chamber (63).

13. The device as claimed in claim 12, wherein a valve for inflation with pressurized gas (67) and a pressure probe (68) are mounted on the accumulator (60) and open into an end section of the return chamber (63), on the side opposite to the separating piston (61).

14. The device as claimed in claim 12, wherein the controlled means of selective blocking comprise a bistable electro-valve (64), switched from its open position to its closed position by control pulses supplied by a push-button control contactor (66) of its electrical control circuit.

15. The device as claimed in claim 14, wherein the accumulator (60) is intended to be fixed to the shock absorber (1, 8) while the contactor (66) of the electrical control circuit of the electro-valve (64) is intended to be fitted to the aircraft.

16. The device as claimed in claim 14, wherein the accumulator an the contactor (66) of the electrical control circuit of the electro-valve (64) are intended to be mounted on the aircraft, the said accumulator being connected to the shock absorber (1, 8) by a flexible duct.

17. An oleo-pneumatic suspension shock absorber for an aircraft undercarriage, of the type comprising a shock absorber body, at least one shock absorber piston, and at least one shock absorber rod mounted in a sliding and sealed manner in the body, and which define in the shock absorber at least one compression chamber, containing a substantially incompressible hydraulic fluid, and at least two expansion chambers containing at least one volume of hydraulic fluid adjacent to at least one volume of fluid which is compressible under pressure, the compressible volumes of the two expansion chambers being initially pressurized at different pressures, a lower presser and a higher pressure, wherein said at least one volume of hydraulic fluid disposed within the expansion chamber having the lower pressure compressible volume is in communication with said compression chamber by an intermediary of throttling means which delimit at least one throttling passage under compression of the hydraulic fluid expelled from said compression chamber into said adjacent volume of hydraulic fluid of said expansion chamber having the lower pressure compressible volume when the shock absorber is caused to compress, and at least one throttling passage under expansion of the hydraulic fluid expelled from said adjacent volume of said expansion chamber into said compression chamber, when the shock absorber is caused to expand the shock absorber further comprising:
- at least one sealed accumulator which is external to the shock absorber,
- at least one separating piston mounted in a sliding and sealed manner in said accumulator, in such a way as to delimit in the latter two chambers of oppositely variable volume, isolated from each other, one of which is a transfer chamber and the other of which is a return chamber,
- at least one transfer duct, connecting said transfer chamber of the accumulator to the expansion chamber having the compressible fluid pressurized at the lower pressure, and
- means for insulating the compressible volume which has been pressurized at the lower pressure, from the accumulator, said means comprising controlled mean for selectively blocking said transfer duct, said controlled means being maneuverable between two positions, one of which is a duct open position, allowing the transfer of at least a part of said compressible volume at the lower pressure from said expansion chamber of the shock absorber, when the latter is loaded in compression, into said transfer chamber of the accumulator, or the return of the fluid from said transfer chamber of the accumulator into said expansion chamber of the shock absorber, when the latter is caused to expand, and the other of which is a duct closed position isolating said expansion chamber of the shock absorber from said accumulator in which said volume of compressible fluid is at least partially retained.

18. The shock absorber as claimed in claim 17, wherein its body (1) comprises an external cylinder (2) and an internal cylinder (3) housed substantially coaxially inside the external cylinder (2), both cylinders being closed by a base (4, 7) at their ends located on the same axial side, and open at their opposite ends (13, 16), and which comprises a single hollow shock absorber rod (8), open at an end (10) which is engaged between the two cylinders (2, 3), and having a closed base (9) at its opposite end, the said rod (8) being axially mounted in a sliding and sealed manner (12, 14) between the two cylinders (2, 3), wherein the throttling means (27, 23, 24) are substantially disposed at the level of the open end (16) of the internal cylinder (3) and wherein, in the rest condition, hydraulic fluid fills a compression chamber (37), delimited inside the rod (8) between its base (9) and the said throttling means, and is in communication through the said throttling means with, on the one hand, a first expansion chamber (31), of annular shape and delimited by the rod (8) between the two cylinders (2, 3), and containing a volume of hydraulic fluid (38) adjacent to the throttling means and to a low pressure gas chamber (34, 63) and, on the other hand, a second expansion chamber (32), delimited in the internal cylinder (3) and containing a high pressure gas chamber (36) and an adjacent volume of hydraulic fluid (39), which is isolated from the hydraulic fluid of the other two chambers (37, 31) by a separating piston (28) mounted in a sliding and sealed manner in the internal cylinder (3), the transfer duct (42', 62') to the accumulator (40, 60) opening through a connector (45, 65) into the end section of the annular expansion chamber (31) which is adjacent to the base (4, 7) of the cylinders (2, 3).

19. The shock absorber as claimed in claim 18, wherein, in the rest state, the low pressure gas chamber (34) is also housed in the annular expansion chamber (31).

20. The shock absorber as claimed in claim 18, wherein the low pressure gas chamber (63) is housed in the return chamber of the accumulator (60) and is isolated from the adjacent hydraulic fluid (38) in the annular expansion chamber (31) and n the transfer chamber (62) of the accumulator (60) by the separating piston (61) mounted in the latter.

21. An aircraft undercarriage, comprising a leg box linked with the structure of the aircraft, at least one member for contact with the ground, such as a wheel (72), and at least one shock absorber (1, 8) connected to the leg box and to the member for contact with the ground (72) in such a way as to dampen the relative movements between the leg box and the said member, wherein at least one shock absorber is a shock absorber (1, 8) as claimed in one of the previous claims 16, 17 or 18.

22. The undercarriage as claimed in claim 21, which is a direct sliding undercarriage, the shock absorber body (1) simultaneously constituting the leg box, and the member for contact with the ground (72) being carried by the end of the shock absorber rod (8) which is external to the said body (1).

23. The undercarriage as claimed in claim 21, which is of the balance arm type, in which the member for contact with the ground is a carried by the lower end of the leg box inclined and articulated by its upper end on the structure of the aircraft, the shock absorber being articulated by its body (1) on the said structure of the aircraft and by the end of its rod (8) external to the said body (1) on the leg box.

24. The undercarriage as claimed in claim 21, which is of the balance arm type in which the member for contact with the ground is carried by the lower end of an inclined balance arm articulated by its upper end on the lower end of the leg box connected by its upper end to the structure of the aircraft, the shock absorber being articulated by its body (1) on the leg box and by the end of its rod (8) external to the said body on the balance arm.

* * * * *